(12) United States Patent  (10) Patent No.: US 9,354,619 B2
Ergenbright et al.  (45) Date of Patent: May 31, 2016

(54) METHOD AND SYSTEM FOR MITIGATING THE EFFECTS OF AN ACTIVE SHOOTER

(71) Applicants: Charles E Ergenbright, Holly Springs, NC (US); Sean K. Hubbard, Austin, TX (US)

(72) Inventors: Charles E Ergenbright, Holly Springs, NC (US); Sean K. Hubbard, Austin, TX (US)

(*) Notice: Subject to any disclaimer, the term of this patent is extended or adjusted under 35 U.S.C. 154(b) by 0 days.

(21) Appl. No.: 14/158,920

(22) Filed: Jan. 20, 2014

(65) Prior Publication Data

US 2015/0204109 A1 Jul. 23, 2015

Related U.S. Application Data

(60) Provisional application No. 61/756,439, filed on Jan. 24, 2013.

(51) Int. Cl.
| | |
|---|---|
| *G01S 3/80* | (2006.01) |
| *G05B 13/00* | (2006.01) |
| *G08B 25/10* | (2006.01) |
| *G07C 9/00* | (2006.01) |

(52) U.S. Cl.
CPC .............. *G05B 13/00* (2013.01); *G08B 25/10* (2013.01); *G07C 9/00571* (2013.01)

(58) Field of Classification Search
CPC ................................ G08B 13/00; G05B 13/00
USPC ........... 340/540, 541, 573.1, 539.25; 348/143
See application file for complete search history.

(56) References Cited

U.S. PATENT DOCUMENTS

| | | | |
|---|---|---|---|
| 8,305,211 B1* | 11/2012 | Morris et al. | 340/541 |
| 2008/0139167 A1* | 6/2008 | Burgess | 455/404.1 |
| 2012/0123758 A1* | 5/2012 | Kevan | 703/6 |
| 2012/0190325 A1* | 7/2012 | Abu-Hakima et al. | 455/404.2 |
| 2013/0333815 A1* | 12/2013 | Blau | C06B 31/02 149/22 |
| 2014/0137257 A1* | 5/2014 | Martinez et al. | 726/25 |
| 2014/0139681 A1* | 5/2014 | Jones, Jr. | G08B 13/19645 348/159 |
| 2014/0214423 A1* | 7/2014 | Camargo | 704/246 |
| 2014/0365574 A1* | 12/2014 | Franks et al. | 709/204 |
| 2015/0124087 A1* | 5/2015 | Jones et al. | 348/143 |
| 2015/0130609 A1* | 5/2015 | Jacobs | 340/517 |
| 2015/0199896 A1* | 7/2015 | Estes et al. | 340/541 |

* cited by examiner

*Primary Examiner* — Brent Swarthout

(57) ABSTRACT

A victim initiated mitigation (VIM) system is capable of mitigating the effects of an Active Shooter in a facility such as a high occupancy facility. The VIM system initiates an immediate automated facility lock-down once activated through the use of one or more Victim Initiated units. This lock-down imposes immediate environmental control measures on the facility and constrains the shooter's freedom of movement, as well as protects potential victims behind locked doors. Additionally, immediate automated alerts and notifications are sent to first responders and facility/campus occupants, and command and control functionality is provided via an incident command center.

17 Claims, 3 Drawing Sheets

METHOD AND SYSTEM FOR MITIGATING THE EFFECTS OF AN ACTIVE SHOOTER

PRIORITY CLAIM

This application claims priority to U.S. Provisional Patent Application Ser. No. 61/756,439, filed on Jan. 24, 2013, which is herein incorporated by reference in its entirety.

BACKGROUND

1. Technical Field

This disclosure relates to security systems and, more particularly, to a system for mitigating the effects of an Active Shooter.

2. Description of the Related Art

Since 1909, at least 272 acts of targeted violence have occurred on 218 college campuses throughout the United States. Currently, 6,563 university campuses contain a combined population of over 21,400,000 people, or what can otherwise be viewed as potential Active Shooter victims. An Active Shooter generally refers to an individual actively engaged in killing or attempting to kill people in a confined populated area typically through the use of firearms, but may also include other types of weapons. The average duration of an Active Shooter incident in high occupancy facilities such as U.S. Institutions of Higher Education (IHEs) is 12.5 minutes. In contrast, the average law enforcement response time is 18 minutes. Current conventional control measures for active shooter incidents have been and remain insufficient to reduce the rate of kill, or improve law enforcement response time to such events.

Current conventional security measures must be augmented or reinforced in some novel way in order to provide an appropriate level of security for students, faculty and staff in American colleges and universities as well as other high occupancy facilities. A high occupancy facility generally refers to a public or private facility containing 100 or greater occupants or supporting a daily transient patron throughput of 100 or greater.

There is no current policy, procedure or conventional system adequate to prevent active shooter scenarios prior to their occurrence or reliably mitigate their effects once these events have started. First responders, when dispatched via standard 911 notifications, are simply not able to respond to an active shooter scenario quickly enough to prevent injuries or deaths.

SUMMARY OF THE EMBODIMENTS

Various embodiments of a method and system for mitigating the effects of an active shooter are disclosed. Broadly speaking, a victim initiated mitigation (VIM) system may mitigate the effects of an active shooter or other aggressor event in a facility such as a high occupancy facility. The VIM system initiates an immediate automated facility lock-down once activated, through the use of one or more victim initiated units. This lock-down may impose immediate environmental control measures on the entire facility and may constrain the shooter's freedom of movement, as well as protect potential victims behind locked doors. Additionally, immediate automated alerts and notifications may be sent to first responders and facility/campus occupants, and command and control functionality is provided via an incident command center.

In one embodiment, a method for mitigating the effects of an aggressor includes detecting an aggressor event such as an active shooter discharging a firearm in a building and activating a victim initiated (VI) unit of a VIM system. The method may also include initiating an aggressor mitigation sequence in response to activation of the VI unit. The aggressor mitigation sequence may include automatically controlling ingress by one or more entry doors of the building. For example, locking down the building by locking all closed doors and releasing all locked doors that may be held open. The aggressor mitigation sequence may also include automatically notifying response personnel of the aggressor event. The aggressor mitigation sequence may further include providing command and control functionality to the response personnel and automatically broadcasting predetermined messages via one or more communications media by, for example, causing the incident command center to begin broadcasting predetermined automated messages. In one implementation, these messages may include automated instructions to response personnel as well as prepared alert messages to other facility personnel.

In another embodiment, the VIM system may include one or more victim initiated (VI) units each configured to automatically initiate an aggressor mitigation sequence in response to being activated. The system may also include an integrated command and control (ICC) unit coupled to the one or more VI units. The ICC unit may be configured to provide command and control functionality to response personnel and to automatically broadcast predetermined messages via one or more communications media in response to initiation of the aggressor mitigation sequence. For example, the ICC unit may selectively control the one or more VI units and provide video from the one or more VI units to response personnel. The VIM system may also include a perimeter security unit that may be configured to automatically control ingress to one or more doors of one or more buildings in response to initiation of the aggressor mitigation sequence.

Figure 1:
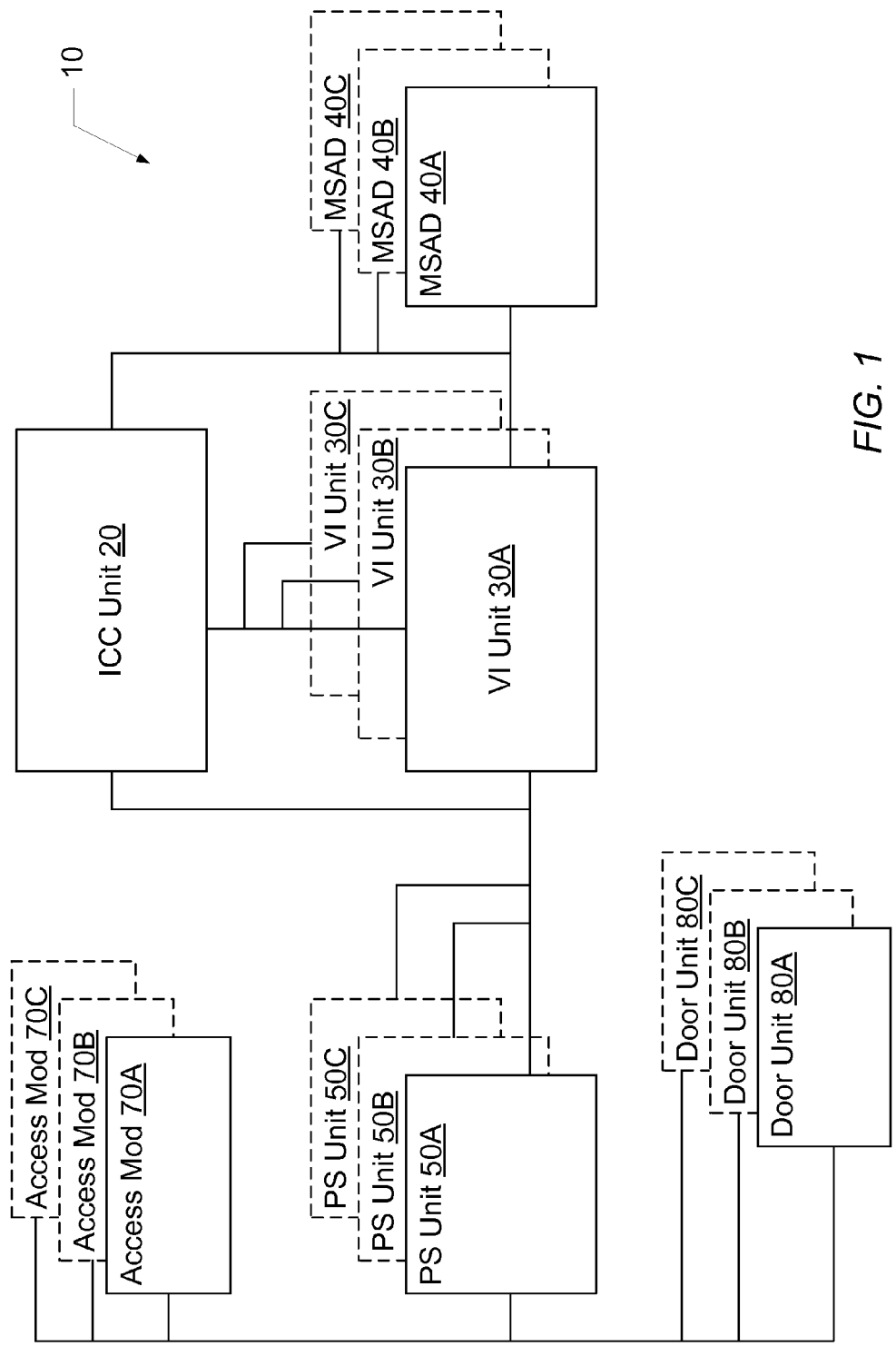
FIG. 1 is a block diagram of one embodiment of a system for mitigating the effects of an active shooter.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must).

Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF THE EMBODIMENTS

System Overview

A victim initiated mitigation (VIM) system generally refers to a system in which a victim or potential victim of an aggressor event such as an Active Shooter, can initiate a combination of immediate mechanical lockdown responses accompanied by a standardized emergency response resulting in the containment and control of Target Areas and Threat Zones, as well as activation of a standardized Emergency Action Plan. It is noted that a target area refers to the primary space defined by the range of the active shooter's capability to injure or kill, while a threat zone refers to a secondary space defined by the active shooter's capability to relocate in order to injure or kill. It is also noted that a victim refers to personnel within the target area and a Potential Victim refers to personnel within the threat zone.

Accordingly, a VIM system such as the VIM system 10 shown in FIG. 1, and described below may initiate an aggressor mitigation sequence that may include immediate automated facility lock-down once activated. This lock-down may impose instantaneous environmental control measures on the entire facility or a portion thereof and may severely constrain the shooter's freedom of movement, as well as protect potential victims behind locked doors by utilizing a simultaneous building lockdown and mass alert system. An active shooter Threat may be contained immediately via automated lock down of the Threat Zone and is controlled by denying freedom of movement to the perpetrator(s). While Emergency Response Teams will maintain complete access to the facility, all other movement will be limited to egress only. The sequence may also include immediately establishing communication between an Incident Command Center and the target area. All concerned individuals such as students, staff and faculty, for example, may be alerted and given initial guidance via prepared messages delivered through numerous networked communication devices. All first responders may also be substantially simultaneously or concurrently alerted by the system. Development of an Immediate Action Plan may be assisted by real-time audio and/or video of the target area. These automated actions will give first responders the time needed to react to the incident while immediately reducing the Rate of Kill. In some implementations, non-lethal immobilization techniques may be used to subdue, control, or otherwise immobilize the active shooter. The immobilization techniques may be activated either automatically or selectively by personnel such as an incident command center operator/dispatcher.

Turning to FIG. 1, one embodiment of a VIM system is shown. The VIM system 10 includes one or more victim initiation (VI) units 30A-30C that are coupled to an incident command center (ICC) 20. The VI units 30A-30C are also coupled to one or more mobile situational awareness devices (MSAD) 40A-40C, and to one or more perimeter security (PS) units 50A-50C, which are in turn coupled to one or more access modules 70A-70C, and to one or more door units 80A-80C. As shown, the VI units 30A-C, the ICC 20, the MSADs 40A-C, the PS Units 50A-C, and the door units 80A-C are communicatively coupled together. In various embodiments, the coupling may be a wired connection, a wireless connection, or a combination as desired. It is noted that components having reference designators with both a number and letter may be referred to solely by their respective numbers where appropriate. It is further noted that while there are some units labeled A-C, it is contemplated that there may be any number of such units in other embodiments.

Victim Initiated Unit

Each VI unit 30 represents a monitoring and activation hub from which a victim or potential victim may report an aggressor event such as an active shooter, and which may initiate an aggressor mitigation sequence. In addition, in some embodiments a properly configured VI unit 30 may automatically detect events such as shots fired from a firearm, and automatically initiate an aggressor mitigation sequence. In one embodiment, a VI unit 30 may be capable of initiating two way communications with the ICC unit 20 and a simultaneous facility lock-down, once activated. The VI unit 30 may send live audio and video signals to the ICC unit 20. As described further below, the ICC unit 20 receives video and audio generated from the activated VI unit 30 and may responsively perform a number of actions such as, for example, communicate automated and personal voice messages to a selected VI unit 30 or broadcast messages to all VI units 30. In various embodiments, the VI unit 30 may communicate wirelessly or via wireline communication links to other system components. The communication may be an encrypted secure link in some embodiments. As described further below, activation of a given VI unit 30 may result in an immediate lock-down of all facility doors via the PS units 50 and the door units 80.

In various implementations, a VI unit 30 may be positioned in locations throughout a facility. For example, on a large campus with multiple buildings, each with multiple lecture halls and classrooms a VI unit 30 may be positioned in each room, or in each hallway, or both, or in selected areas as desired. In smaller facilities, a single VI unit 30 may suffice in each building. The system is scalable to accommodate as many or as few VI units 30 as may be necessary to provide adequate coverage.

Accordingly, in one embodiment, each VI unit 30 may include a durable enclosure for secure installation in various locations. In addition, as described further below the VI unit 30 may include a camera, a microphone, a speaker and a communication unit. More particularly, in one embodiment the camera may be representative of a high-speed, high-resolution panoramic camera that captures live video/still pictures. The camera can be remotely controlled from the ICC unit 20 or an MSAD unit 40. For example, the camera may be panned, tilted, zoomed or otherwise controlled from a remote location. The microphone may capture live audio inputs, and in one embodiment may monitor the ambient background in conjunction with shot recognition software for detection of shots fired.

In some embodiments, the VI unit 30 may also include a fingerprint enabled call button with a protective shield, which when pressed activates the VI unit 30. The call button may also capture biometric data such as the fingerprint. In addition the VI unit 30 may also include a standard keypad that serves as a secondary activation mechanism and/or a manual override.

Figure 2A:
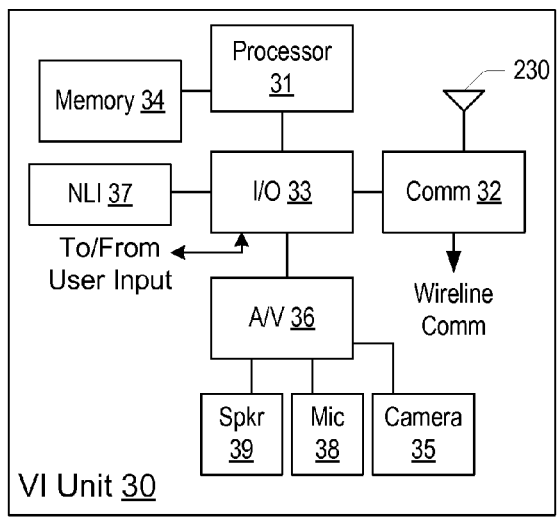
FIG. 2A is a diagram depicting one embodiment of the victim initiation unit of FIG. 1.

In one embodiment, the VI unit 30 may include a non-lethal immobilization (NLI) unit (shown in FIG. 2A). In such embodiments, upon activation, the NLI unit may emit one of a variety of forms of NLI to immobilize and/or control an aggressor. For example, there are currently available and known methods to immobilize personnel in a particular area using such mechanisms as sound waves and light emitting devices, among others. In various embodiments, the NLI unit may be activated either through remote manual initiation by personnel through the ICC 20, or the NLI unit may be activated automatically such as in the instance of the shot recognition software detecting shots fired. These immobilization and control measures may immobilize the entire room or area until an organized response force can respond. As described further below, activation of an access point by an access module will deactivate the NLI unit prior to response personnel entering the area.

In FIG. 2A, a diagram depicting one embodiment of the VI unit of FIG. 1 is shown. Referring now to FIG. 2A, the VI unit 30 includes a processor 31 coupled to a memory 34 and to an input/output (I/O) unit 33. The I/O unit 33 is coupled to a communication unit 32, an audio/visual (A/V) unit 36, and an NLI unit 37, and to user input such as a keypad or fingerprint sensor (not shown). The A/V unit 36 is also coupled to a microphone 38 and to a speaker 39.

In one embodiment, the processor 31 may be representative of any type of general purpose processing device capable of executing program instructions. The processor 31 may also include digital signal processing capabilities in some embodiments. The memory 34 may be representative of any type of memory, and may include portions of volatile memory, and non-volatile memory for storing program instructions for execution by the processor 31, and may therefore be considered as a non-transitory computer readable storage medium. The memory 34 may be programmed locally or remotely via the network. The I/O unit 33 may facilitate routing of messages and packets between the processor 31 and the communication unit 32, A/V unit 36 and the NLI unit 37. The communication unit 32 may include a transceiver (not shown) for transmitting and receiving communications to/from other system components. The communication link between components may be wired via a wireline such as a high-speed Ethernet link for example, or the link may be a wireless link using any of a variety of radio transmission protocols through antenna 230. The A/V unit 36 may process audio input from the microphone and provide audio output to the speaker. Likewise the A/V unit 36 may also receive and process video input from the camera 35, and provide that processed video to the communication unit 32 to be sent to the ICC 20. As described above the NLI unit 37 may generate non-lethal immobilization outputs once activated. The VI unit 30 may be powered via AC power through the building power, and may also include battery (not shown) for power backup use when the AC power has been removed.

It is noted that in one embodiment one microphone may be used to capture live audio during an activation and a secondary microphone (not shown) may be used to monitor ambient background in conjunction with shot recognition software. However, in other embodiments, a single microphone may be used and the A/V unit 36 may switch between uses as desired.

Incident Command Center

Figure 2B:
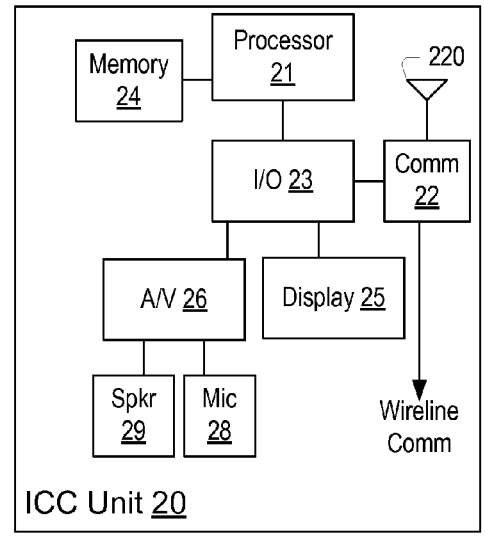
FIG. 2B is a diagram depicting one embodiment of the incident command center of FIG. 1.

Referring back to FIG. 1, the ICC 20 may be representative of a command center console and display device. As such, the ICC 20 may be networked with and may communicate with all other components of the VIM system 10 via the encrypted communication network and allows the ICC user or dispatcher to effectively perform command and control during an aggressor event such as an Active Shooter scenario. One embodiment of an ICC 20 is shown in FIG. 2B.

During operation, software instructions stored in the ICC 20 may generate an ICC homepage that may include a detailed satellite image of the entire campus (if multiple facilities are monitored) or a comprehensive schematic of the entire facility (if only one facility is being monitored), or both in selective manner. This homepage may be modified as desired to reflect the specific facility being monitored. When a networked VI unit 30 is activated, the pinpoint location and live video input from the activated VI unit 30 may be superimposed on or otherwise displayed on the ICC display and live two-way audio communication may be established with the activated VI unit 30. The ICC dispatcher may take control of the camera of the activated VI unit 30. In addition, the dispatcher may take control of other cameras in other non-activated VI units 30. Live video feeds from each camera may also be displayed on the ICC 20. However, in one embodiment, the video feed of the activated VI unit 20 may remain on top and in view at all times as long as the dispatcher maintains two-way communication with that VI unit 30. If the dispatcher initiates two-way communication with another VI unit 30, then the video feed from that selected VI unit 30 will stay on top.

A number of drop-down menus may be made available to the dispatcher on the ICC display so that if the dispatcher determines the nature of the emergency, additional functionality may become available. The menus may include emergency categories such as Active Shooter, Hostage Scenario, Natural Disaster, Bomb, Fire, and Chemical Spill, for example. By selecting the appropriate emergency category, preplanned automated notification messages including an accurate pinpoint location of the incident may be transmitted to all local emergency response agencies.

Appropriate predetermined or preplanned and automated alerts may also be sent to all networked computers as well as all cell phones and other communication devices that may be registered to the VIM system 10. Appropriate preplanned and automated emergency notification messages may also be transmitted to local radio and television stations with appropriate authentication required for immediate broadcast. The ICC display may be divided into zones for campus settings.

The pre-planned alerts may be programmed into the ICC 20 as desired. In one embodiment, the pre-planned alerts may be automatically and dynamically customized to deliver specific instructions to individual facility occupants based on the location of the activated VI unit compared to the work location, class schedule, or cellular enabled location of each facility occupant. These specific instructions may assist facility occupants with survivability instructions and crowd control measures that may facilitate exit traffic and prevent facility occupants from entering the facility or campus who are not already on site. In addition, dynamically customized specific instructions may be automatically sent to response personnel based on changing threat environments detected via the activated and non-activated VI units 30.

When appropriate, the ICC 20 may initiate a remote lockdown of additional facilities by zone or individual facility, or remotely unlock doors of selected buildings. Detailed floor plans of all facilities monitored may be stored in the ICC 20. Floor plans may be utilized to create automated responder approach routes which can be transmitted to the MSAD units 40 as described in greater detail below.

In FIG. 2B, one embodiment of an incident command center (ICC) unit is shown. Referring now to FIG. 2B, the ICC 20 includes a processor 21 coupled to a memory 24 and to an input/output (I/O) unit 23. The I/O unit 23 is coupled to a display unit 25, a communication unit 22, and an audio/visual (A/V) unit 26. The A/V unit 26 is further coupled to a microphone 28 and a speaker 29.

In various embodiments, the processor 21 may be a general purpose processor capable of executing program instructions stored in the memory 24. The memory 24 may be representative of any type of memory, and may include portions of volatile memory, and non-volatile memory for storing program instructions for execution by the processor 21, and may therefore be considered as a non-transitory computer readable storage medium. The memory 24 may be programmed locally or remotely via the network. The processor 21 may send commands via the I/O unit 23 to the communication unit 22 and the A/V unit 26. In one embodiment, the various components within ICC 20 may be manufactured on a single integrated circuit such as a system on a chip (SOC), for example. In one embodiment, the display unit 25 may be representative of a flat panel touch style display. In addition, in various embodiments, the display unit 25 may also include a graphic processor and associated memory (both not shown) for rendering graphics for the display. For example, in one embodiment, the ICC 20 may be implemented as an integrated computing device such as a tablet, notebook, iPad™ or similar device. However, it is contemplated that in other embodiments the ICC 20 may be implemented as a traditional computer system with a separate monitor, keyboard and mouse, or other user interface device. The communication unit 22 may include a transceiver (not shown) for transmitting and receiving communications to/from other system components. The communication link between components may be wired via a wireline such as a high-speed Ethernet link for example, or the link may be a wireless link using any of a variety of radio transmission protocols and antenna 220.

Mobile Situational Awareness Device

Referring back to FIG. 1, the MSAD 40 may be implemented as a hand-held mobile unit that may allow first responders the ability to view live video and remotely manipulate the camera in the threat area. The MSAD 40 may also allow the responders to establish two way communications with any VI unit 30, and in particular the active shooter via the VI Unit 30 that may be nearest the shooter.

In one embodiment, the MSADs 40 are mobile communication platforms that may transmit and receive live video/audio, and/or still pictures. Each MSAD 40 may monitor and/or communicate with all networked VI units 30 via the encrypted wireless network.

More particularly, a given MSAD 40 may initiate two way communications with and may remotely control the camera of any networked VI unit 30 using, for example, pan, tilt, and zoom commands. Each MSAD 40 may also store detailed schematics and floor plans of all facilities, compare those plans to MSAD current location, and suggest approach routes to the Target Area. Each MSAD 40 may transmit its current location to the ICC 20 at predetermined intervals. Location information may be derived using GPS and/or terrestrial location information. Each MSAD 40 may provide menu options which enable the response team to request additional assets. The MSAD 40 may store current contact information for all applicable emergency service agencies and which may be categorized by capability.

Figure 2C:
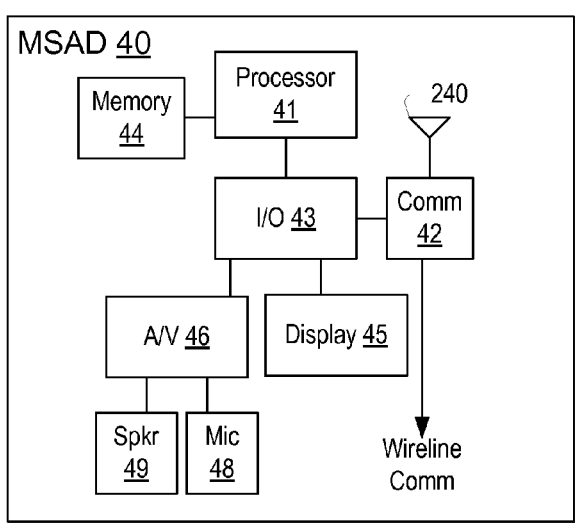
FIG. 2C is a diagram depicting one embodiment of the mobile situational awareness device of FIG. 1.

In FIG. 2C, one embodiment of an MSAD 20 of FIG. 1 is shown. Referring now to FIG. 2C, the MSAD 20 includes a processor 41 coupled to a memory 44 and to an input/output (I/O) unit 43. The I/O unit 43 is coupled to a display unit 45, a communication unit 42, and an audio/visual (A/V) unit 46. The A/V unit 46 is further coupled to a microphone 48 and a speaker 49.

In various embodiments, the processor 41 may be a general purpose processor capable of executing program instructions stored in the memory 44 to implement the various operational features described above. The memory 44 may be representative of any type of memory, and may include portions of volatile memory, and non-volatile memory for storing program instructions for execution by the processor 41, and may therefore be considered as a non-transitory computer readable storage medium. The memory 44 may be programmed locally or remotely via the network. The processor 41 may send commands via the I/O unit 43 to the communication unit 42 and the A/V unit 46. In one embodiment, the various components within MSAD 40 may be manufactured on a single integrated circuit such as a system on a chip (SOC), for example. In one embodiment, the display unit 45 may be representative of a flat panel touch style display. In addition, in various embodiments, the display unit 45 may also include a graphic processor and associated memory (both not shown) for rendering graphics for the display. For example, in one embodiment, the MSAD 40 may be implemented as an integrated computing device such as a tablet, notebook, iPod™, mobile cellular telephone, or similar device. As such, the MSAD 40 may provide real-time situational information to responders.

Perimeter Security Unit

Referring back to FIG. 1, the perimeter security (PS) units 50 may be configured to control ingress and egress of a building in conjunction with the door units 80. The PS units 50 may communicate with the ICC 20 and each networked VI unit 30 to facilitate a lock down of a building. In one embodiment, upon activation of a VI unit 30, the activated VI unit 30 may send a command to one or more PS units 30 to release any open doors in the building and/or to lock all doors once closed. As such, the PS unit 50 may subsequently send signals to the door units 80 to release and lock the doors. It is noted that some doors may be locked and held open via the electromagnetic style door release units 80. In such embodiments, the PS unit 50 may simply release the door and it will lock upon closing. In other embodiments, doors may be left closed but unlocked to retain building heating and cooling. In such cases, the PS units 50 may send signals to the door units 80 which may lock the already closed doors. In one embodiment, the door locks may be mechanical electromagnetic plate locks, while in other embodiments the door locks may be implemented using solenoid style deadbolts, or other electronic style locking mechanisms.

Figure 2D:
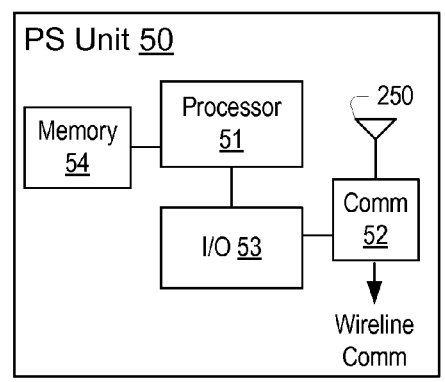
FIG. 2D is a diagram depicting one embodiment of the perimeter security unit of FIG. 1.

All doors equipped with these releases would be fire code compliant and would only lock to prevent ingress. Egress from rooms or facilities would not be limited by this lock down procedure. Activation of the electromagnetic door releases and initiation of the facility lock down can be accomplished through the activation of a VI unit 30, or remotely from the ICC 20 as described above. In FIG. 2D, one embodiment of the PS unit 50 of FIG. 1 is shown and in FIG. 2E one embodiment of the door lock/release unit 80 of FIG. 1 is shown.

Referring now to FIG. 2D, the PS unit 50 includes a processor 51 coupled to a memory 54 and to an input/output (I/O) unit 53. The I/O unit 53 is coupled to a communication unit 52.

In various embodiments, the processor 51 may be a general purpose processor capable of executing program instructions stored in the memory 54 to implement the various operational features described above. The memory 54 may be representative of any type of memory, and may include portions of volatile memory, and non-volatile memory for storing program instructions for execution by the processor 51, and may therefore be considered as a non-transitory computer readable storage medium. The memory 54 may be programmed locally or remotely via the network. The processor 51 may send commands via the I/O unit 53 to the communication unit 52 and the A/V unit 46. In one embodiment, the various components within PS unit 50 may be manufactured on a single integrated circuit such as a system on a chip (SOC), for example.

Figure 2E:
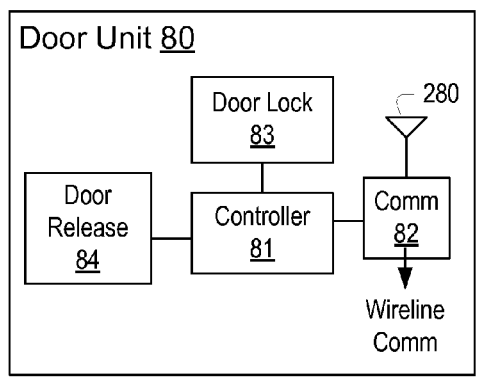
FIG. 2E is a diagram depicting one embodiment of the door release unit of FIG. 1.

Referring to FIG. 2E, the door unit 80 includes a controller 81 coupled to a door release unit 84, a door lock unit 83, and a communication unit 82.

In one embodiment, the controller 81 may be a general purpose microcontroller capable of executing program instructions stored in an embedded memory (not shown) to implement the various operational features described above. The embedded memory of the controller 81 may be considered as a non-transitory computer readable storage medium. The controller 81 may be programmed locally or remotely via the network. The controller 81 may send commands to the communication unit 82. The door unit 80 may receive commands from the PS unit 50 wirelessly or through a wireline network. In one embodiment, the door release unit 84 may represent the magnetic door release described above. Similarly, the door lock unit 83 may represent the door lock mechanism described above. In addition, each door lock unit may also include an RF sensor which may be used as an access point to unlock the door once activated by a properly coded access module.

It is noted that in some embodiments, the door units 8o may be used in a stand-alone configuration in which the ICC 20, VI units 30, and/or the MSADs 40 may communicate directly with the door units 80 to lock and unlock doors. In such an embodiment, the door unit 80 may receive commands from the wirelessly or through a wireline network without PS units 50.

Access Modules

Referring back to FIG. 1, access modules 70 allow responders access to the locked down buildings. In one embodiment, an access module may be implemented using a key fob having a radio frequency identification (RFID) module within the fob. When the fob is brought within a predetermined distance of an access point of the building, the doors associated with the access point may unlock, and any non-lethal immobilization may be disarmed and/or deactivated for the area near the entry point. Alternatively, the access module 70 may be implemented as an access card with an RFID module or other type of access mechanism such as a bar code or magnetic strip as desired. It is noted that an access point may refer to any type of receiver configured to detect and authenticate a given access module. For example, an access point may be implemented as a proximity reader which may detect the presence of an RFID enabled access module or other short range RF access module.

In another embodiment, each MSAD 40 may be configured to as an access module to access a locked down facility. The MSAD 40 may be programmed with specific access codes for access into facilities using, for example, bump, near field communication, or dedicated short range communication technologies. In further embodiments, each MSAD 40 may include application software that allows the MSAD 40 to access any door remotely, using for example, cellular, Wi-Fi, or WiMAX technologies rather than using short range RF technologies. In such embodiments, each MSAD 40 may be programmed with building door access codes to activate an access point. Once a building is selected by a responder, the MSAD 40 may be used to unlock a door, and disarm any active non-lethal immobilization activities in the immediate vicinity of the ingress door.

Figure 3:
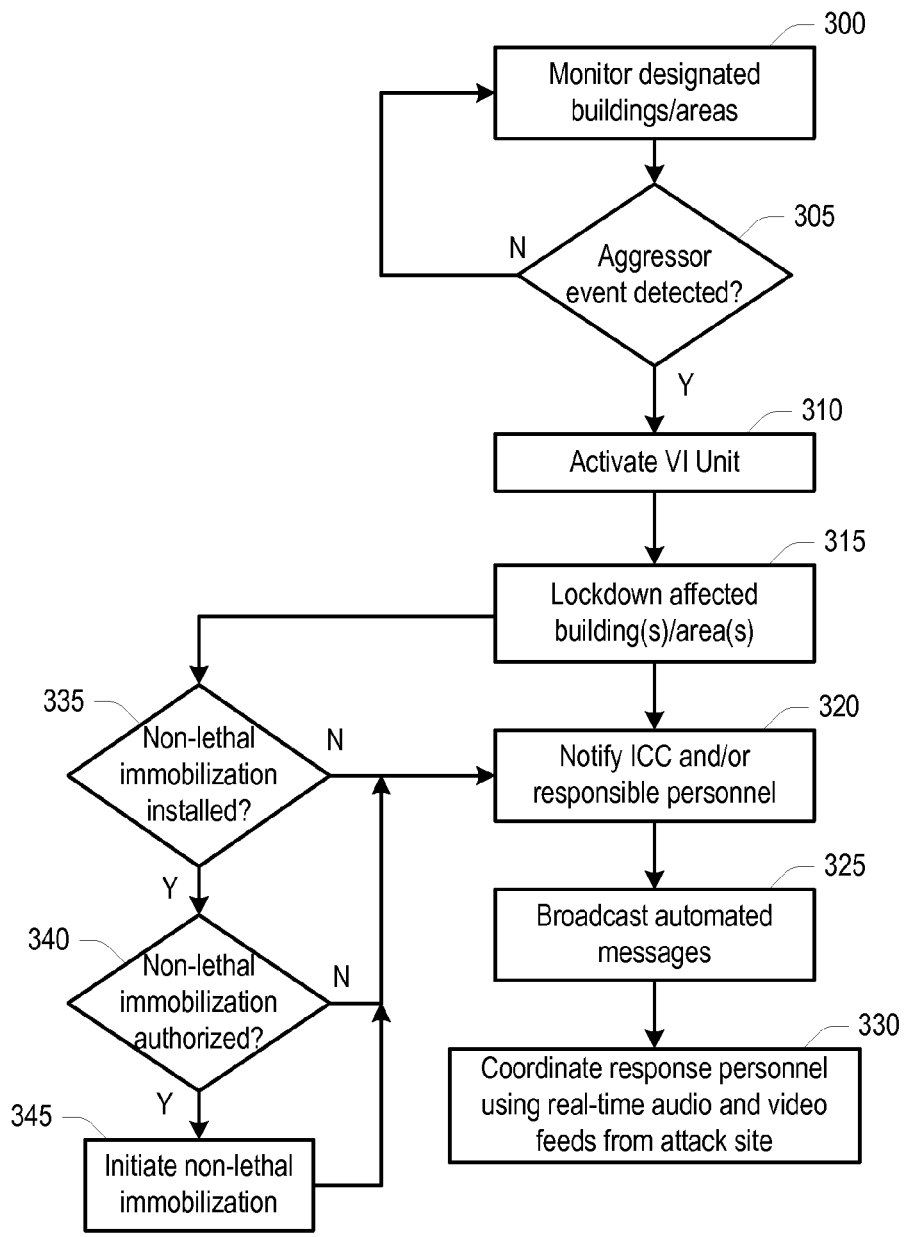
FIG. 3 is a diagram depicting an operational flow of an activation and mitigation sequence of one embodiment of the system of FIG. 1.

Turning to FIG. 3, a diagram depicting an operational flow of an activation and mitigation sequence of one embodiment of the system of FIG. 1 is shown. Referring collectively to FIG. 1 through FIG. 3 and beginning in block 300, each VI unit 30 in conjunction with an ICC unit 20 may monitor designated buildings and areas. It is noted that the software of the VIM system 10, may be modified to track and update situational data as required by the operating facility. Each VI unit 30 may also be utilized as Public Announcement devices and room monitoring devices. If no aggressor event is detected (block 305), the system continues to monitor.

However, if an aggressor event is detected, an aggressor mitigation sequence is initiated. In one embodiment, initiating of the sequence begins upon activation of a VI unit 30 (block 310). In one embodiment, the aggressor event may be detected by a person, and as such the person may manually activate the VI unit 30. For example, when a threat is identified by a potential victim, they would depress a call button on the closest VI unit 30. The initiation of this call via the VI unit 30 results in an immediate facility lock-down of selected interior and/or exterior doors of the affected building and establishment of two-way communication with the ICC 20. Alternatively, a given VI unit 30 may be activated automatically by, for example, shot recognition software being executed by the VI unit 30. This may happen in an instance where shots were fired prior to a VI unit 30 being activated manually. In either case, once activated, the VI unit 30 initiates a lockdown of the affected building or buildings (block 315).

In one embodiment, if the VIM system includes non-lethal immobilization components such as NLI 37 of FIG. 2A for example (block 335), and non-lethal immobilization is authorized (block 340), non-lethal immobilization tactics may be deployed (block 345). In one embodiment, non-lethal counter measures may be automatically deployed if the system is configured to do so. More particularly, in conjunction with the shot recognition software detecting shots fired, the non-lethal counter measures may be automatically deployed. In other embodiments, non-lethal counter measures may only be deployed by an operator of the ICC 20 upon positive confirmation of the attack, where or not shot recognition software detects shots fired.

In addition, the activated VI unit 30 notifies the ICC 20, which may initiate activation of a notification protocol (block 320). In one embodiment, the ICC 20 may begin broadcasting automated preplanned messages to facility and other personnel as desired (block 325). For example, the ICC 20 may initiate alerts to all emergency response personnel with pinpoint incident location and event description. The ICC 20 may also initiate mass notifications via networked media devices to all facility/campus occupants/patrons. The dispatcher that is monitoring the ICC 20 may begin coordinating response personnel using real time video and audio feds from the activated VI unit 20 (block 330). In addition, the dispatcher may also begin lockdown of selected additional buildings via the ICC 20 as the situation changes. The additional lockdown may be performed concurrently or subsequent to the notification of personnel as described in block 320. After receiving the alert from the ICC 20, emergency response personnel are guided to the pinpoint location of the incident via MSADs 40 and are able to gain further situational awareness of the event through remote manipulation of the camera of selected VI units 30, live video/audio from the target area, and dynamically customized messages from the ICC 20. Once on scene, emergency responders are able to enter the Threat Area with assigned access modules.

It is noted that although the operations described in the embodiment of FIG. 3 are shown in a particular order, it is contemplated that in other embodiments the operations may be performed in a different order. For example, some operations may be performed concurrently or in parallel with other operations rather than serially. Alternatively, some operations may be performed before or after other operations that are shown in FIG. 3. Lastly, there may be additional operations that are not shown, and some operations may be omitted, depending on implementation.

The VIM system 10 described above may allow a potential victim or other facility occupants to immediately initiate an alert and accompanying control measures. This combination of alert and control may effectively improve victim survivability and reduce the incident rate of kill. The VIM system 10 may also allow potential victims to make their own decisions with regard to their survivability. More particularly, if they believe that it is best to remain behind a locked door for the duration of the incident, they have that capability. Alternatively, if they decide that it is best to evacuate the facility, they also have that capability since building egress is allowed.

The VIM system 10 may contain a threat immediately through a lock down of a threat building and the VIM system 10 may further contain additional threats or the same threat through a selective lock down of other buildings by the ICC 20. The situation may be controlled as an aggressor's movements are constrained. Emergency response personnel may have complete access to all areas of the facility. Two way communication is established immediately between ICC 20 and the Target Area. All facility occupants may also be alerted and given initial guidance via prepared messages. The ICC 20 may alert emergency response personnel immediately and simultaneously. The ICC may also communicate with all responding agencies. The increased control provided by the immediate containment of the situation may limit an aggressor's actions. Additionally, the two way communication between the ICC 20 and the Target Area as well as real time video of the Target Area will assist in the development of an immediate action plan.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   activating a victim initiated (VI) unit of a VI system in response to the VI unit detecting an aggressor event; and
   the activated VI unit initiating an aggressor mitigation sequence;
   wherein the aggressor mitigation sequence includes:
   the activated VI unit automatically controlling ingress by one or more entry doors of the building;
   automatically notifying response personnel of the aggressor event;
   providing command and control functionality to the response personnel; and
   automatically broadcasting predetermined messages via one or more communications media, and further, in response to activation by personnel at a remote monitoring location or automatic activation responsive to a sensor detecting a gunshot, activating a non-lethal immobilization unit (NLI) in proximity to location of an aggressor event, and disarming or deactivating a NLI in an area proximate a reader location at a building access point, when a responder presents an access module to a reader at the access point.

2. The method of claim 1, wherein controlling ingress includes closing pre-locked doors of the building.

3. The method of claim 1, wherein controlling ingress includes locking closed doors of the building.

4. The method of claim 1, wherein the aggressor event includes an active shooter discharging a firearm.

5. The method of claim 4, wherein detecting an aggressor event in a building includes the VI unit detecting the discharging of a firearm and automatically initiating the aggressor mitigation sequence.

6. The method of claim 1 wherein the NLI includes at least one of sound wave and light emitting immobilization measures deployed to an area of the building associated with the aggressor event.

7. The method of claim 1, wherein automatically notifying response personnel of the aggressor event includes the activated VI unit sending activation signals to an incident command center (ICC) that is monitored by the response personnel.

8. The method of claim 7, wherein providing command and control functionality to the response personnel includes the VI unit transmitting real-time video and audio signals to the ICC.

9. The method of claim 8, wherein providing command and control functionality to the response personnel further includes the response personnel selectively controlling one or more VI units, displaying the video from each selected VI unit, and selectively controlling ingress to additional buildings.

10. A system comprising:
    one or more victim initiated (VI) units each configured to automatically initiate an aggressor mitigation sequence in response to being activated;
    an incident command and control (ICC) unit coupled to the one or more VI units, wherein the ICC unit is configured to provide command and control functionality to response personnel and to automatically broadcast predetermined messages via one or more communications media in response to initiation of the aggressor mitigation sequence; and
    a perimeter security unit coupled to the VI unit and the ICC unit and configured to automatically control ingress to one or more doors of one or more buildings in response to signals sent from an activated VI unit, and further, in response to activation by personnel at a remote monitoring location or automatic activation responsive to a sensor detecting a gunshot, activating a non-lethal immobilization unit (NLI) in proximity to location of an aggressor event, and disarming or deactivating a NLI in an area proximate a reader location at a building access point, when a responder presents an access module to a reader at the access point.

11. The system of claim 10, wherein the PS unit is configured to close pre-locked doors and to lock closed doors of the building.

12. The system of claim 10, wherein the aggressor event includes an active shooter discharging a firearm.

13. The system of claim 12, wherein the VI unit is configured to detect the discharging of a firearm and automatically initiate the aggressor mitigation sequence.

14. The system of claim 10, wherein the ICC unit is configured to receive from an activated VI unit, real-time video and audio signals, selectively control one or more VI units, display the video from each selected VI unit, and selectively control ingress to doors of additional buildings.

15. A victim initiation (VI) unit of an aggressor mitigation system, the VI unit comprising:
   a memory configured to store program instructions;
   a processor coupled to the memory and configured to execute the program instructions;
   wherein the processor is configured to detect a manual activation of the VI unit by a person via a user input of the VI unit;
   wherein the processor is further configured to configured to detect an automatic activation of the VI unit based upon monitoring background sound characteristics;
   wherein the processor is further configured to, in response to detecting that the VI unit has been activated:
      automatically transmit signals to close pre-locked doors and to lock closed doors of a building associated with the VI unit;
      automatically transmit notification signals to notify response personnel that the VI unit has been activated; and
      automatically transmit real-time audio and video for use by the response personnel.

16. The system of claim 10, wherein the VI unit is activated automatically in response to detecting an aggressor event.

17. The system of claim 10, wherein the VI unit is activated manually by a person.

* * * * *